UNITED STATES PATENT OFFICE.

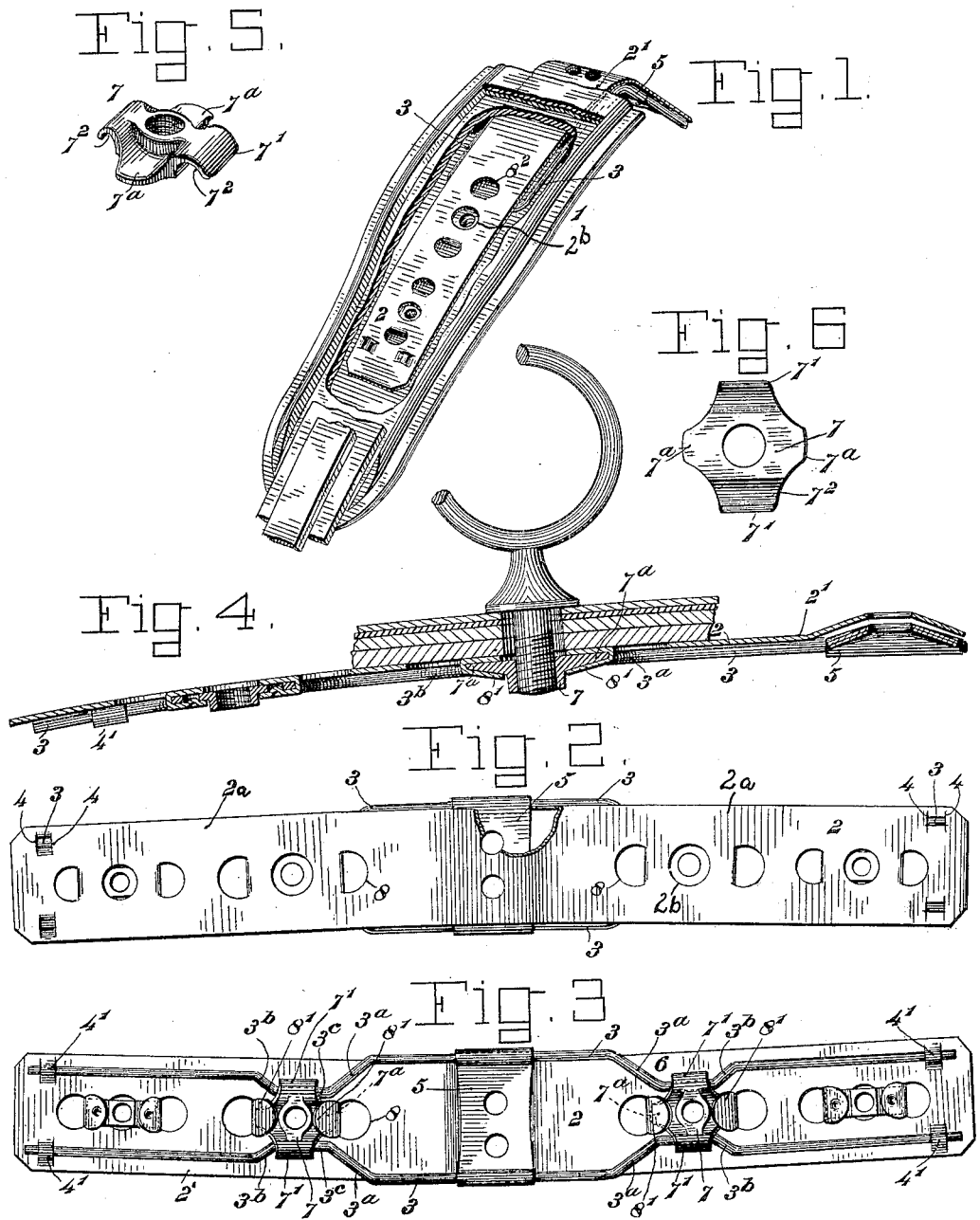

HARRY B. WHITE, OF CANTON, OHIO, ASSIGNOR TO THE GILLIAM MANUFACTURING COMPANY, OF CANTON, OHIO, A CORPORATION OF OHIO.

HARNESS-SADDLE.

1,104,397.

Specification of Letters Patent. Patented July 21, 1914.

Application filed March 29, 1909. Serial No. 486,581.

*To all whom it may concern:*

Be it known that I, HARRY B. WHITE, a citizen of the United States, residing at Canton, in the county of Stark and State of Ohio, have invented certain new and useful Improvements in Harness-Saddles, of which the following is a specification, reference being had therein to the accompanying drawings.

This invention relates to a harness saddle and more particularly to a saddle tree formed of resilient metal.

One object of the invention is to produce a harness saddle having a tree formed from resilient metal and provided with means for resisting torsional strains thereon without unduly affecting its resiliency.

Another object of the invention is to produce a light resilient saddle tree provided with reinforcing strips that are constructed and arranged to prevent twisting of the tree frame without unduly affecting its resiliency.

Another object of the invention is to provide in a resilient saddle tree, reinforcing strips or rods that are inturned intermediate their ends and are adapted to resist torsional strains upon the tree frame.

Another object of the invention is to provide improved means for locking and securing the reinforcing means to the tree frame.

A further object of the invention is to produce in a resilient saddle tree having reinforcing means consisting of wire rods, improved devices to overlie and engage said reinforcing means and secure the said means in place, and also to carry the terrets.

In the drawings Figure 1 is a perspective view of a harness saddle embodying my invention, parts being broken away. Fig. 2 is a top plan view of a saddle tree. Fig. 3 is a bottom plan view of the tree. Fig. 4 is a longitudinal sectional view of the tree. Figs. 5 and 6 are detail views.

In the drawings 1 indicates a harness saddle which may, with the exception of the saddle tree, be of any suitable or preferred construction.

2 indicates, as a whole, a saddle tree embodying my invention. The tree 2 comprises a frame 2' having wings or side plates 2ª, preferably formed from resilient metal. Each wing or side plate has an opening 2ᵇ therethrough to receive a suitable terret shank.

3, 3 indicate a pair of strengthening rods or strips formed from suitable material and each extending substantially from end to end of the tree. The rods 3 are preferably secured to the lower surface of the tree frame 2'. The rods 3 are spaced apart substantially parallel to each other, and preferably arranged near the opposite longitudinal side edges of the said tree frame 2'. Near its opposite ends, and at opposite sides, the frame 2' is preferably slit on lines 4, 4 to form binding or holding straps 4', one for each end of each rod 3, as shown in Figs. 2 and 3, to receive and hold each end of each rod to the said frame. Any other suitable means may be employed for this purpose.

5 indicates a spacing plate arranged substantially midway between the opposite ends of the rods. The ends of this plate 5 are preferably bent around the rods 3 and operate to hold the said rods suitably spaced from each other. The plate 5 is preferably arranged beneath the check rein hook of the harness saddle and is provided with an aperture to receive the bolt or stem of the said hook, whereby it is secured in position relative to the tree frame 2'.

6 indicates, as a whole, binding means for the rods 3, 3 arranged on either side of a line passing transversely through the center of the tree frame 2', that is, between the plate 5 and the free ends of the rods. Each of these binding means preferably comprises a clamping means or plate 7, which may also be the means for holding in place one of the terrets of the saddle. The means or plate 7 is provided with wings or extensions 7', 7' on two of its opposite sides, which wings overlie and engage the rods 3, 3. 7² indicates grooves to receive the rods 3, 3, they being formed in the wings or extensions 7' on that side which faces the tree frame 2'.

In order to secure the clamping means or plate 7 in place on the tree frame 2' and thus bind and hold the rods 3 thereto, the said tree frame 2' is preferably slitted on lines 8 to form lips 8' which are turned or bent over to engage the adjacent sides of the adjoining clamping means or plate, the latter being preferably provided with lugs or ears 7ª, which are preferably flattened, as shown in the drawings, to provide a relatively large, rigid surface with which the lips 8' engage.

In the preferred form of the invention the rods 3, 3 are bent inwardly as shown at 3ª, 3ª, 3ᵇ, 3ᵇ to form off-set portions 3ᶜ which latter are engaged by the wings 7' of the binding nuts 7. This form of construction not only facilitates the binding of the rods 3, 3 to the frame 2', but also strengthens the tree frame 2' in such manner as to effectively resist torsional strains upon the same. Another advantage incident to this construction is that it prevents all endwise movements of the rods 3, 3 relative to the frame 2'.

It will be noted that the clamping means or plates are held in engagement with the reinforcing strips or rods by means of the lips 8', independently of any clamping action between such plates, the rods and the frame 2' incident to the screwing in place of a terret. In fact, it will be readily seen that the terret may be inserted or removed at will without possibility of the coöperating plate becoming displaced and that each terret and clamping plate constitutes a device for clamping the reinforcing rods to the tree frame, as contradistinguished from the purpose of the pairs of lips 8' which merely hold each clamping plate with which they engage and the tree wing and reinforcing rods in proper relation to each other. The advantage of such a construction will be quickly appreciated by any one skilled in the art.

To those skilled in the art of making articles of the class described, many alterations in construction and widely differing embodiments and applications of my invention will suggest themselves, without departing from the spirit and scope thereof. My disclosures and the description therein are purely illustrative, and are not intended to be in any sense limiting.

What I claim is:

1. A tree for a harness saddle, comprising a frame having a sheet metal wing slitted to form a pair of lips, a plurality of strengthening rods separated from each other and extending longitudinally of the frame, and means for holding the said rods and frame together arranged on opposite sides of a central line passing transversely through said frame and held in position against shifting longitudinally thereof by said lips.

2. A tree for a harness saddle, comprising a frame having a sheet metal wing formed with an opening to receive a terret shank and slitted to form a pair of lips, a plurality of strengthening rods separated from each other and extending longitudinally of the frame, and clamping devices including a terret extending through the opening in said wing and positioning and clamping means engaging said rods, the said lips engaging and holding said clamping means against shifting longitudinally of said frame.

3. A tree for a harness saddle, comprising a frame formed from sheet metal, a pair of strengthening rods extending substantially from end to end of said frame, means for spacing the central portions of said rods from each other, means for securing the free ends of the rods to the frame, and separate means, each including a device engaging both rods and lips struck up from the metal of the frame, for binding the rods to the frame, the said binding means being arranged between the spacing means and the means which secure the free ends of the rods to the frame.

4. For a harness saddle, a tree comprising a frame formed from sheet metal, a pair of strengthening rods separated from each other and extending from the center of the frame longitudinally toward its opposite ends, means for spacing the central portions of the rods from each other, and means arranged on either side of the spacing means and between it and the free ends of the rods for binding them to the frame, the metal of the frame between the rods on opposite sides of the binding means being slitted and struck-up to form lips which are bent over into engagement with the binding means to hold the latter in place.

5. A tree for a harness saddle comprising a frame formed from sheet metal, a pair of rods separated from each other and extending longitudinally of the frame and having inturned portions on opposite sides of a central transverse line, binding means for securing the inturned portions to the frame including lips carried by the frame, the central portions of the rods being bent outwardly and extending parallel to each other in planes different from the remaining portions of the rods, and separate means for binding the free ends of each rod to the frame arranged between said first mentioned binding means and the free ends of the rods, the said binding means comprising a strap struck up from the metal of said frame.

6. A tree for a harness saddle, comprising a frame formed from sheet metal, a pair of spaced rods extending longitudinally of said frame, each of said rods having off-set portions on opposite sides of a central line passing transversely through said frame, means for securing said off-set portions to the frame, the said means including members struck up from said frame, means intermediate said securing means for spacing the rods from each other, and separate means for spacing the free ends of the rods from each other.

7. A tree for a harness saddle, comprising a frame formed from sheet metal, a pair of spaced rods extending longitudinally of said frame, each of said rods having off-set portions on opposite sides of a central line passing transversely through said frame, means for securing said off-set portions to the frame, the said means including members struck up from said frame, means intermediate said securing means for spacing the rods from each other, and separate means for spacing the free ends of the rods from each other, the said separate spacing means being arranged to permit relative movement in a longitudinal direction between said tree frame and said rods.

In testimony whereof I affix my signature in the presence of two witnesses.

HARRY B. WHITE.

Witnesses:
J. WHITING, Jr.,
BERTHA OBRINGER.

Copies of this patent may be obtained for five cents each, by addressing the "Commissioner of Patents, Washington, D. C."